(12) United States Patent
Hahn et al.

(10) Patent No.: US 6,318,947 B1
(45) Date of Patent: Nov. 20, 2001

(54) PULLING-STYLE RESTRAINT FOR A PARKED SWAP BODY

(75) Inventors: Norbert Hahn, Franklin; Robert J. Harter, LaCrosse; Reinhard E. Sander, Milwaukee, all of WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/235,429

(22) Filed: Jan. 22, 1999

(51) Int. Cl.$^7$ .................................................. B65G 69/00
(52) U.S. Cl. .............................. 414/401; 414/396; 410/82
(58) Field of Search .................................. 414/401, 584, 414/396; 410/103, 116, 100, 82, 76, 57, 67

(56) References Cited

U.S. PATENT DOCUMENTS

| | | | |
|---|---|---|---|
| 1,418,966 | * 6/1922 | Perin | 414/401 |
| 1,494,484 | * 5/1924 | Hudspeth | 294/132 |
| 1,778,852 | * 10/1930 | Fitch | 414/401 |
| 3,404,444 | * 10/1968 | Isbrandtsen | 29/897 |
| 3,439,821 | * 4/1969 | Hand | 410/82 |
| 3,566,804 | * 3/1971 | Mietla et al. | 410/103 |
| 3,810,500 | 5/1974 | Brun et al. | 141/231 |
| 3,860,209 | * 1/1975 | Strecker | 410/116 |
| 4,146,888 | 3/1979 | Grunewald et al. | 340/679 |
| 4,191,503 | 3/1980 | Neff et al. | 414/401 |
| 4,208,161 | 6/1980 | Hipp et al. | 414/401 |
| 4,249,840 | * 2/1981 | Kalaes et al. | 410/81 |
| 4,264,259 | 4/1981 | Hipp | 414/401 |
| 4,321,000 | * 3/1982 | Novak | 410/82 |
| 4,373,847 | 2/1983 | Hipp et al. | 414/401 |
| 4,553,895 | * 11/1985 | Ellis | 14/71.1 |
| 4,605,353 | 8/1986 | Hahn et al. | 414/401 |
| 4,634,334 | 1/1987 | Hahn et al. | 414/401 |
| 4,648,764 | * 3/1987 | Pavlick | 410/77 |
| 4,692,755 | 9/1987 | Hahn | 340/687 |
| 4,735,542 | * 4/1988 | Fisher et al. | 414/401 |
| 4,830,563 | 5/1989 | Yeakle | 414/401 |
| 4,861,217 | * 8/1989 | Erlandsson | 14/71.1 |
| 5,054,987 | * 10/1991 | Thornton | 414/390 |
| 5,212,846 | 5/1993 | Hahn | 14/69.5 |
| 5,297,921 | * 3/1994 | Springer et al. | 414/401 |
| 5,338,136 | * 8/1994 | Hetchler | 410/100 |
| 5,388,947 | * 2/1995 | Ancel et al. | 414/401 |
| 5,490,749 | * 2/1996 | Arbues | 410/103 |

(List continued on next page.)

FOREIGN PATENT DOCUMENTS

| | | | |
|---|---|---|---|
| 2149062 | * 4/1973 | (DE) | 414/401 |
| 0 706 912 A1 | 4/1996 | (EP) . | |
| WO 79/00576 | 8/1979 | (WO) . | |
| WO 93/01952 | 4/1993 | (WO) . | |

OTHER PUBLICATIONS

Internationa Search Report corresponding to International Patent Application Serial No. PCT/US00/01186, European Patent Office, date Jul. 06, 2000, 8 pages.

Primary Examiner—Eileen D Lillis
Assistant Examiner—Paul T. Chin
(74) Attorney, Agent, or Firm—Marshall, Gerstein & Borun (57) ABSTRACT

A pulling-style restraint for a swap body container parked at a truck loading dock includes an elongated member having a base at one end and a restraining member at an opposite end. The base can be attached to the dock, while the restraining member is adapted to be connected to a leg or bottom fitting of the container. The elongated member can be a bar or an elongated pliable member such as a strap, chain, or cable. The elongated member can be tightened by a take-up device such as a reel, chain-binder, turnbuckle or combinations thereof. Additional features might include a light that indicates engagement, a twist-lock restraining member, and a firm landing pad on which the container legs may rest.

25 Claims, 8 Drawing Sheets

U.S. PATENT DOCUMENTS

| | | | |
|---|---|---|---|
| 5,494,387 | * | 2/1996 | Ruegg ................................. 410/103 |
| 5,505,575 | | 4/1996 | Alexander ........................... 414/401 |
| 5,542,798 | * | 8/1996 | Rawdon et al. ..................... 410/100 |
| 5,839,864 | | 11/1998 | Reynard ................................. 410/69 |
| 5,941,666 | * | 6/1999 | Waters ................................. 410/103 |
| 5,961,263 | * | 10/1999 | Nunez ................................. 410/103 |
| 6,017,173 | * | 1/2000 | Authony et al. ..................... 410/100 |
| 6,113,337 | * | 9/2000 | Massey ................................. 414/401 |

* cited by examiner

PULLING-STYLE RESTRAINT FOR A PARKED SWAP BODY

BACKGROUND OF THE INVENTION

1. Field of the Invention

The subject invention generally pertains to swap body containers, and more specifically to a device that restrains a parked swap body container.

2. Description of Related Art

A swap body is typically a large freight container having four retractable legs. The legs are usually retracted while the swap body is in transit on the bed of a truck, trailer, ship, or rail car. When parked at a truck loading dock, the legs are typically extended to support the container upon a driveway with the floor of the container generally aligned flush to the floor of the loading dock. This allows a forklift to drive into the container for loading or unloading, yet allows the truck that delivered the container to leave.

While the legs provide a vertical/columnar support for the weight of the container and its contents (and material handling equipment), the legs are not designed to resist substantial horizontal forces. Substantial horizontal forces, however, can be exerted on the legs. For example, if the forklift inside the container was to suddenly stop by applying the brakes or striking cargo, the horizontal reaction force would be transmitted to the container's legs. Since a forklift can weigh thousands of pounds, and given the relative instability of the legs to resist horizontal movement, it is possible that an abrupt stop or collision could cause the container to move horizontally away from the dock, opening up a potentially hazardous gap between the container and the dock. Further, such horizontal movement could place a torque or bending force on one or all of the legs, causing them to buckle, or fold up, or (in a worst-case scenario) to collapse altogether. Such an accident might seriously harm the forklift operator, others nearby, the cargo or surrounding structure.

SUMMARY OF THE INVENTION

In order to minimize undesirable horizontal movement of a swap body container, there is provided a pulling-style restraint that includes an elongated member coupled to a base at one end and a restraining member at an opposite end. The base is fixed relative to a driveway, while the restraining member is adapted to engage a leg or bottom fitting of the swap body container, thereby restraining the container in relation to the driveway.

Such a restraint helps keep a swap body container from slipping too far away from the edge of the dock, thereby possibly avoiding creating a hazardous gap between the container and the edge of the loading dock and the related undesirable forces on the legs that could lead to their failure.

In some embodiments, a twist-lock connector inhibits the restraining member from inadvertently slipping out of the aperture of the swap body container's bottom fitting.

In some embodiments a spring return ratchet reel provides a self-tightening feature that allows the container to shift toward the dock, but not away from it.

DESCRIPTION OF THE PREFERRED EMBODIMENT

Figure 1:
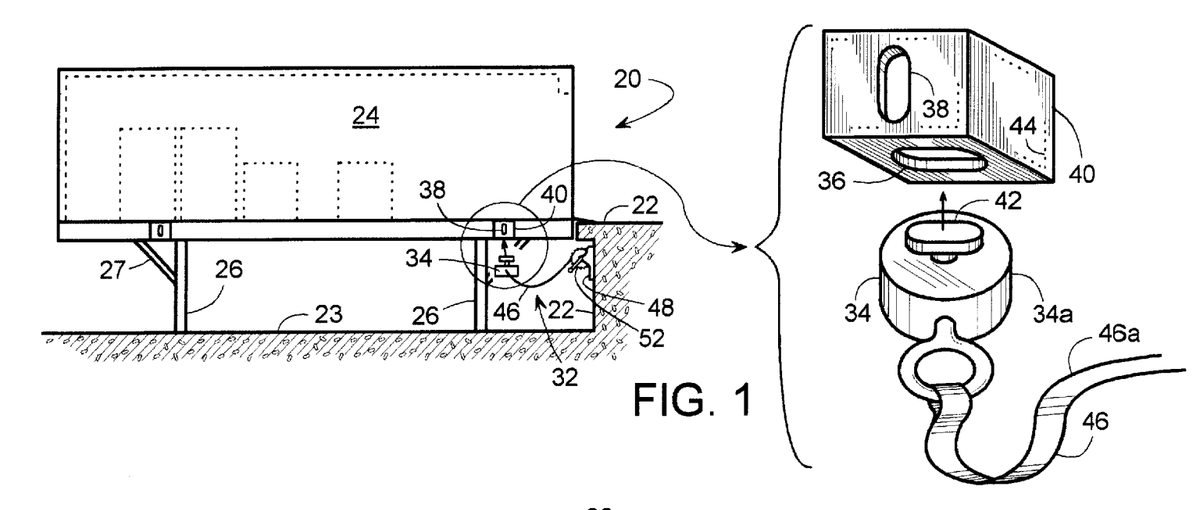
FIG. 1 is a side view of a pulling-style restraint with a close-up perspective view of one portion.
Figure 2:
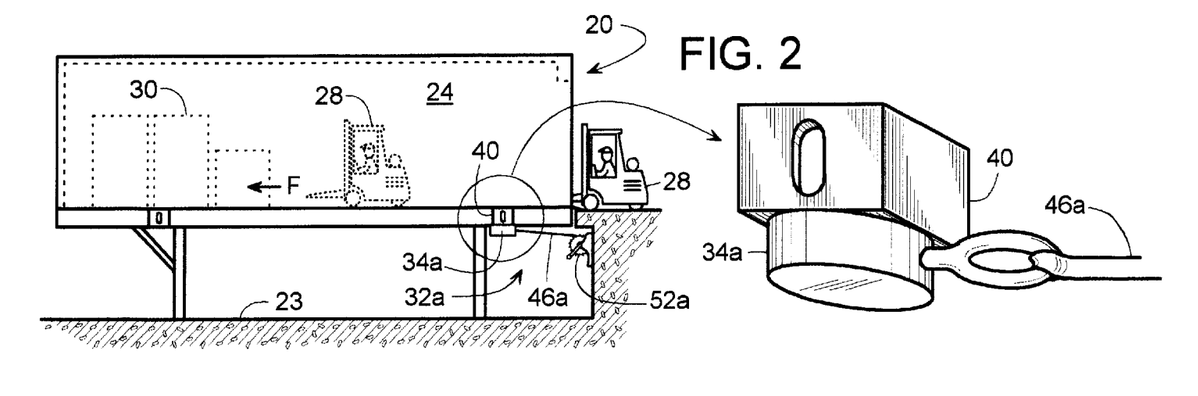
FIG. 2 is another side view of the restraint with a close-up perspective view of one portion.

FIGS. 1 and 2 show side views of a swap body 20 parked upon a driveway of a truck loading dock area 22. Swap body 20 is primarily a relatively large freight container 24 that typically includes four legs 26 that extend downward to support the weight of container 24 when parked. However, when swap body 20 is in transit on, for example, the trailer bed of a truck, legs 26 are typically repositioned for storage by being folded up underneath container 24. When a truck delivers swap body 20 to loading dock area 22, extending legs 26 allows the truck to leave, while container 24 may be loaded or unloaded by a forklift 28.

Movement of lift truck 28 inside the container, particularly quick stops and quick starts, results in forces F (FIG. 2) being exerted on the container. As legs 26 support container 24 in place, these forces F are transmitted to the legs, and can lead to torques and stresses within the legs that could lead to their failure. Use of a container restraint as disclosed herein helps restrain the container to minimize its movement away from the dock, and thus minimize harmful stresses on the legs. Accordingly, this problem is minimized by providing a restraint that limits the movement of container 24 away from an adjacent structure, such as a loading dock, by engaging a leg or bottom fitting of the swap body container.

This is generally accomplished by a pulling-style restraint 32 that includes an elongated member 46 coupled to a base 48 at one end and a restraining member 34 at an opposite end. Base 48 is mounted in a fixed orientation in relationship to driveway 23 by being mounted to a stationary structure adjacent the loading area. Examples of a stationary structure would include but not be limited to a loading dock wall, or a vertical stanchion that is anchored to the driveway 23. Restraining member 34 is adapted to engage a leg 26 or bottom fitting 40 of container 24. To accommodate various size containers whose legs or bottom fittings may be at different locations relative to the upper platform of dock 22, a take-up unit 52 adjusts the distance between restraining member 34 and base 48. One exemplary embodiment of such a restraint is shown in FIGS. 1 and 2.

For this particular example, a restraint 32a includes a restraining member 34a that is adapted to engage one of two oblong apertures 36 or 38 of fitting 40. It should be noted that swap body containers typically have four such fittings (e.g. see European Standard No. EN 284:1992 E) that are used to couple the bottom of a swap body atop a trailer bed of a truck. However, at loading dock 22, fitting 40 is open and available for engagement by a restraining member to help stabilize container 24. For example, restraining member 34a includes an oblong plug 42 of a size and shape adapted to mate with aperture 36 or 38 of fitting 40. Once mated, restraining member 34a can be rotated (e.g., 90 degrees) to engage an interior surface 44 of fitting 40, thereby providing a positive connection.

An elongated member, such as a strap 46a, secures restraining member 34a to base 48, which in turn is anchored to loading dock 22 and is thus fixed relative to driveway 23. It should noted that the elongated member does not necessarily have to be a strap, but could be any one of a variety of elongated members including, but not limited to, a chain, cable or even a bar. To minimize the distance that container 24 can move away from the upper platform of dock 22, this restraint draws strap 46a taut by way of an exemplary take-up member 52, such as a winch 52a (explained further in reference to FIG. 8).

Figure 3:
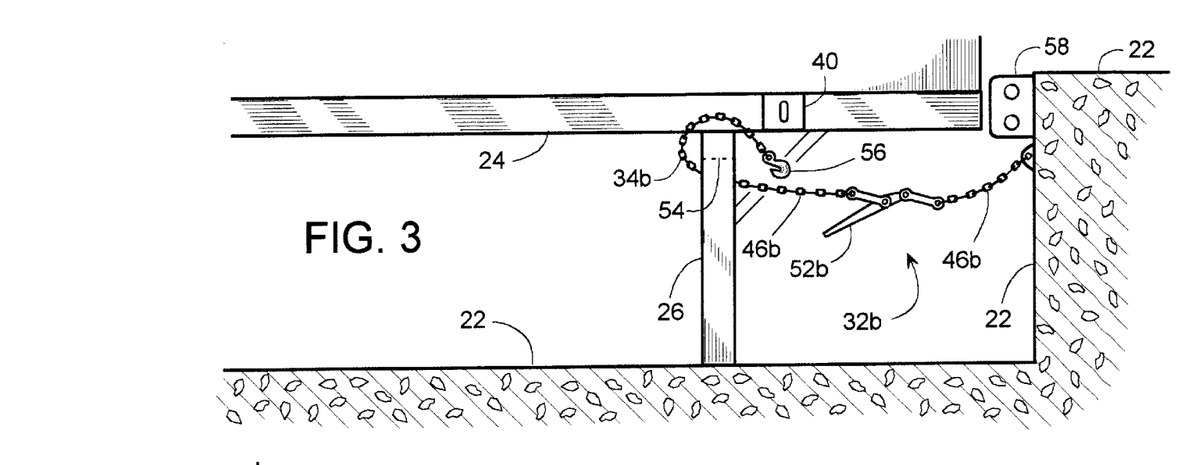
FIG. 3 is a left side view of another embodiment of a pulling-style restraint.
Figure 4:
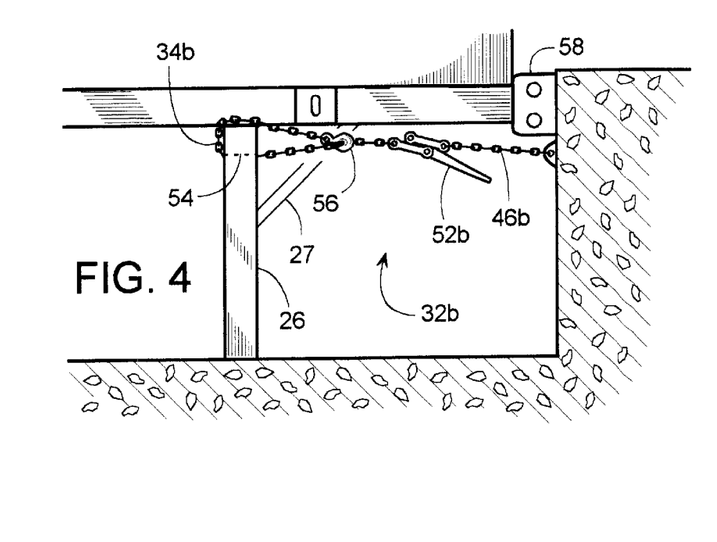
FIG. 4 is another left side view of the embodiment of FIG. 3, but with the restraint locked.
Figure 5:
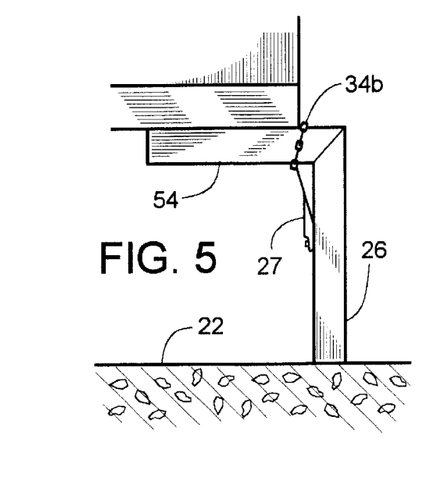
FIG. 5 is a partial left end view of FIG. 4.

For a restraint that engages a container's leg rather than a bottom fitting, refer to FIGS. 3–5. In this embodiment, the elongated member is a chain 46b, the take-up member is a chain-binder 52b, and the restraining member is a portion of chain 46b. The portion of chain 46b that could be considered as the restraining member is referred to as chain portion 34b. Instead of engaging fitting 40, chain portion 34b wraps around a laterally extending section 54 of leg 26. In this example, a chain hook 56 engages an intermediate link of chain 46b to take up much of the slack of chain 46b, while chain-binder 52b further tightens chain 46b to draw the back face of container 24 up against a bumper 58 of dock 22. It should be noted that a chain-binder, sometimes referred to as a "load-binder," is a conventional toggle locking over center device well known to those skilled in the trucking industry.

Figure 6:
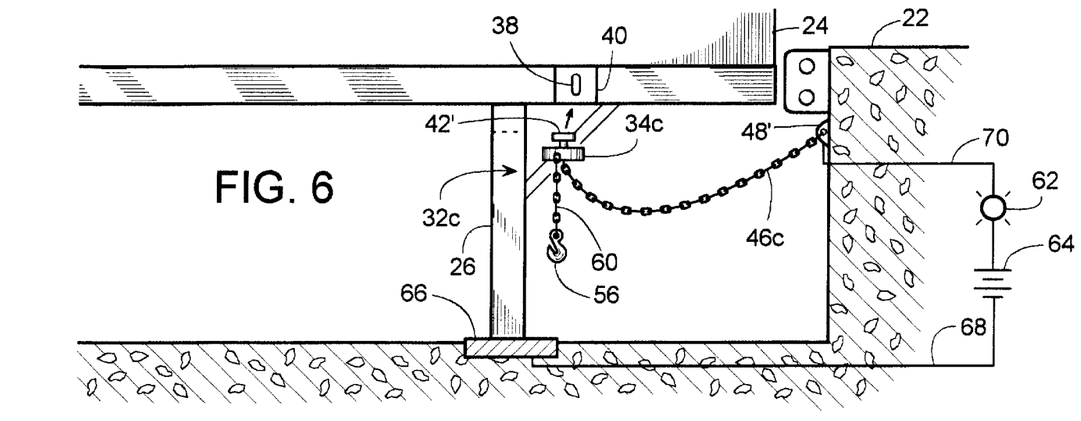
FIG. 6 is a side view of yet another embodiment.
Figure 7:
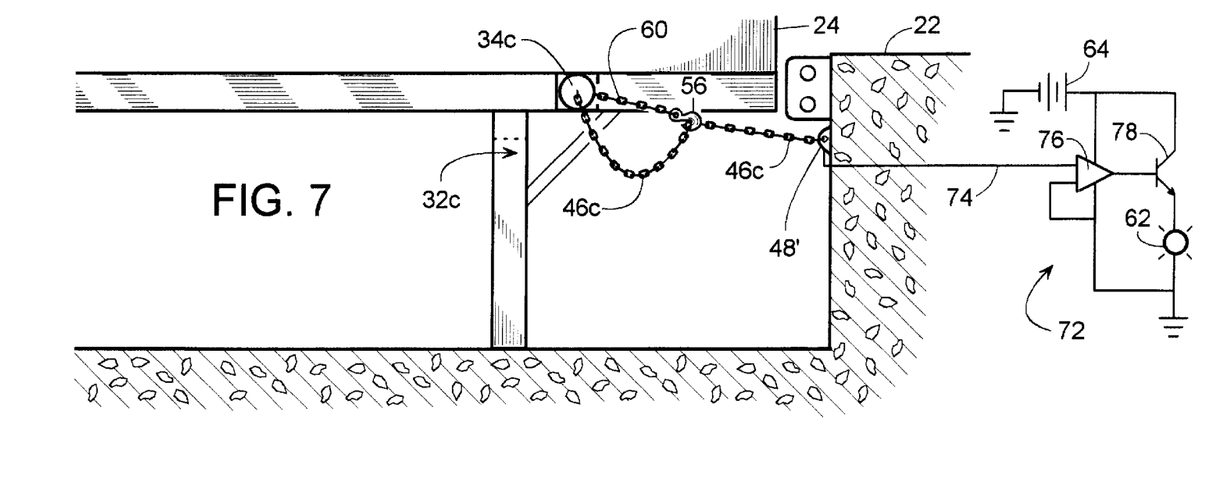
FIG. 7 is another side view of the embodiment of FIG. 6, but with a variation of the indicator light circuit.

In another exemplary embodiment of the invention, shown in FIGS. 6 and 7, a restraint 32c is comparable to those just discussed; however, chain-binder 52b has been eliminated, and an elongated plug 42' of a restraining member 34c engages side aperture 38 instead of bottom aperture 36 (although engaging either aperture would work). A chain 46c couples restraining member 34c to a base 48', and a chain segment 60 connects chain hook 56 to restraining member 34c. To restrain a container, an operator inserts plug 42' into aperture 38 (or 36), then manually pulls most of chain 46 tightly away from base 48'. Chain segment 60 and the portion of chain 46cclosest to base 48' is then kept taut by having hook 56 engage an intermediate link of chain 46c.

For additional safety and convenience, an indicator light system can be added to any of the embodiments herein to provide an indication of whether container 24 is effectively restrained. Such an indication may be valuable to a dock worker, a forklift truck driver that is loading or unloading the container, or the driver of the truck that hauls the swap body. As in FIGS. 6 and 7, the light indication can be provided by a simple series circuit of electrically conductive components comprising a light system 62 which could include a series of inside and outside red and green lights, an electrical power source 64 (e.g., 24 volts), a metal landing pad 66, leg 26, fitting 40, restraining member 34c, chain 46c, and a base 48', as shown in FIG. 6. The connection between restraining member 34c and fitting 40 serves as an electrical switch adapted to complete the circuit to turn light system 62 on and off. Pad 66 can perhaps serve an addition purpose of providing a firm level landing pad upon which leg 26 can rest, thereby establishing a reliable vertical reference datum that accurately and repeatedly aligns the inside floor of container 24 to upper platform of dock 22. Wires 68 and 70 allow light system 62 to be installed at most any desired location.

As a slight variation to the embodiment of FIG. 6, two restraints 32c are used: one at each side of container 24 engaging both rear legs. In this example, light system 62 is connected in series with power source 64, both restraints 32c, and container 24 itself. Light system 62 would turn on upon current passing in series through power source 64, left restraint 34c, left fitting 40, container 24, right fitting 40, right restraint 34c, and light system 62. In this arrangement, pad 66 can be omitted.

Another variation of the indicator light circuit is shown in FIG. 7. In this embodiment, a circuit 72 renders retaining member 34c as a touch-sensitive switch responsive to electromagnetic energy, such as radio wave signals received and conducted by container 24. Wire 74 conveys the signal to an input of an amplifier 76, which drives a transistor 78 to turn light system 62 on and off. Circuit 72 is schematically illustrated to represent the myriad of conventional touch-sensitive circuits that may include numerous other electrical components that might provide the circuit with a threshold that is sufficient to distinguish between contact with a large container 24 and the touch of dock worker or chain 46c, itself.

Figure 8:
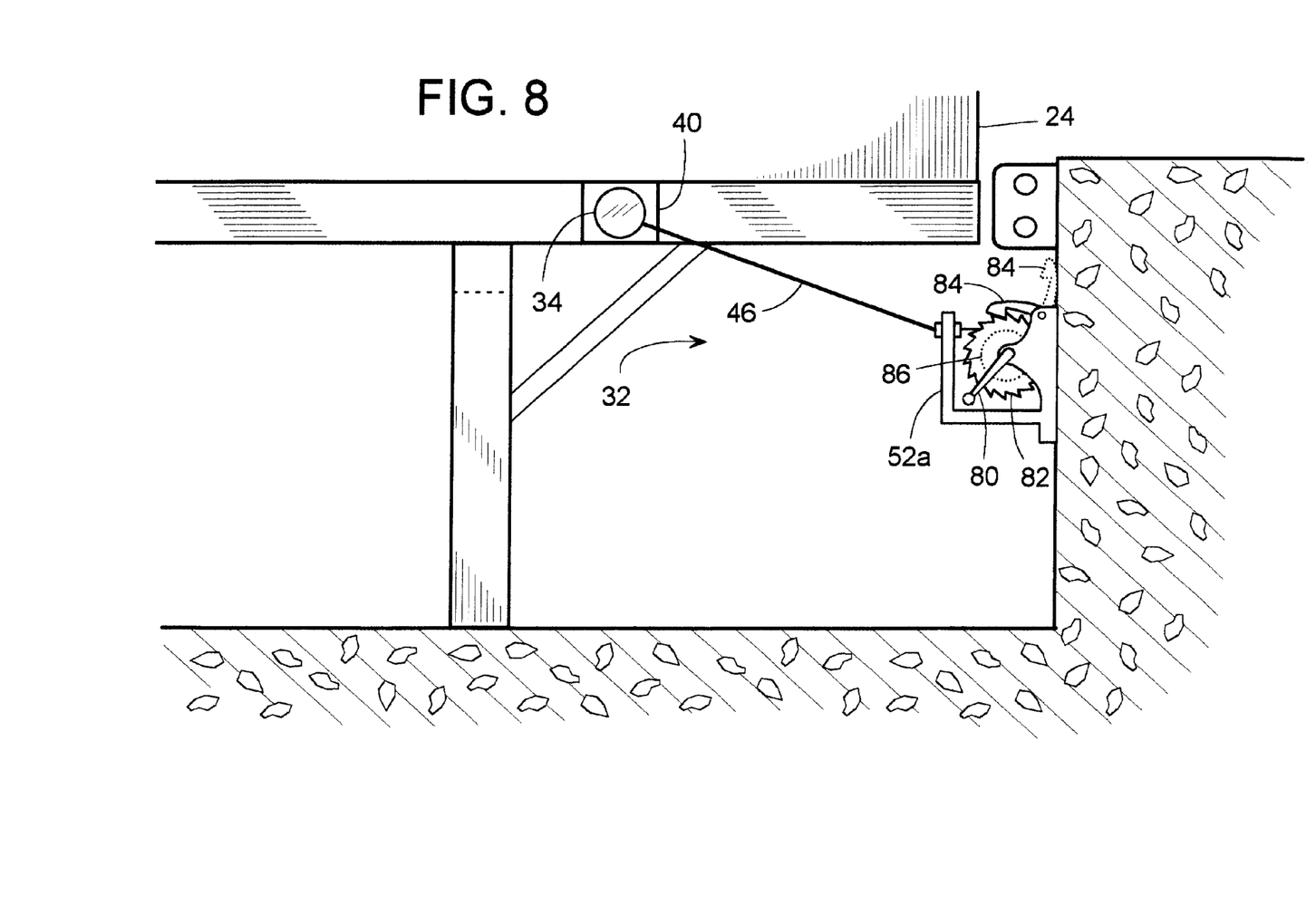
FIG. 8 is a side view of an alternate embodiment.
Figure 9:
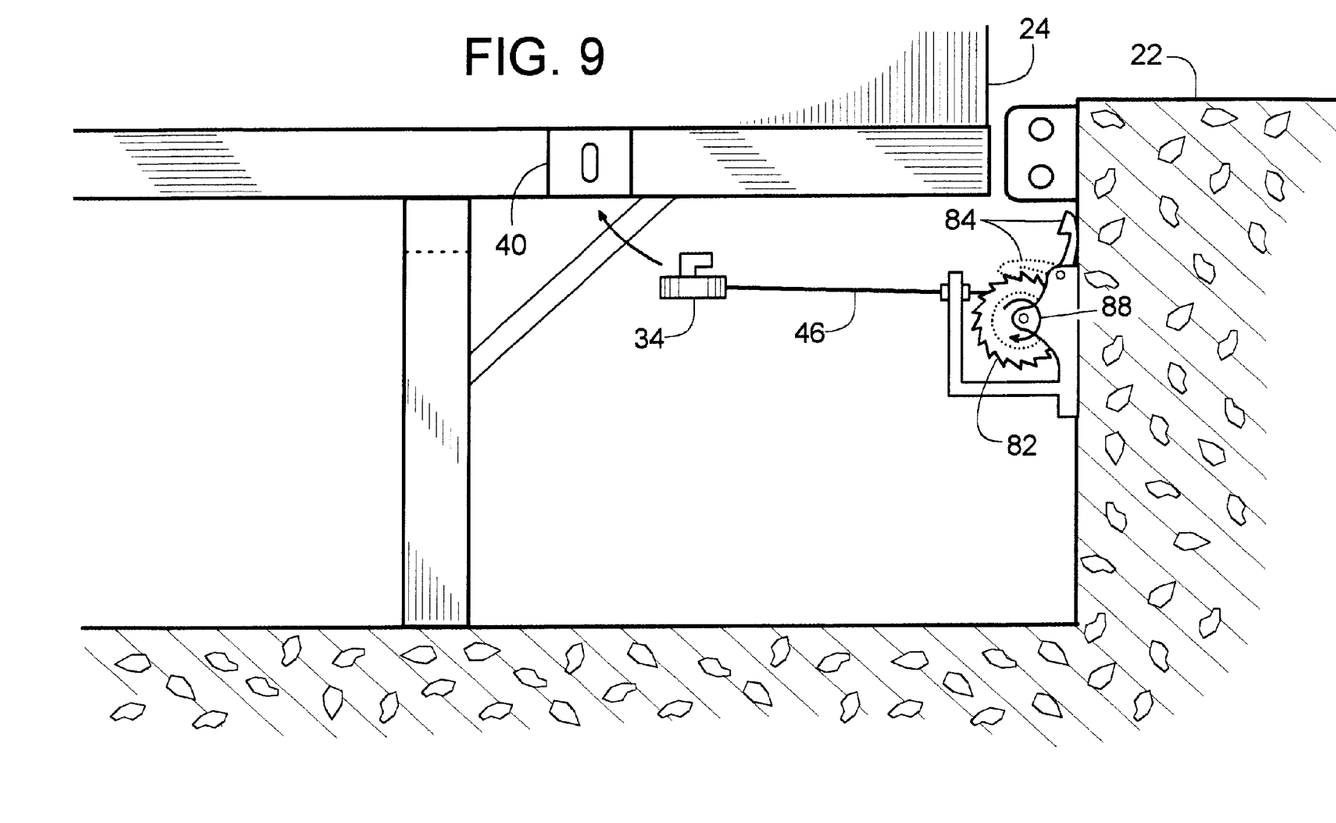
FIG. 9 is a side view of another alternate embodiment.
Figure 10:
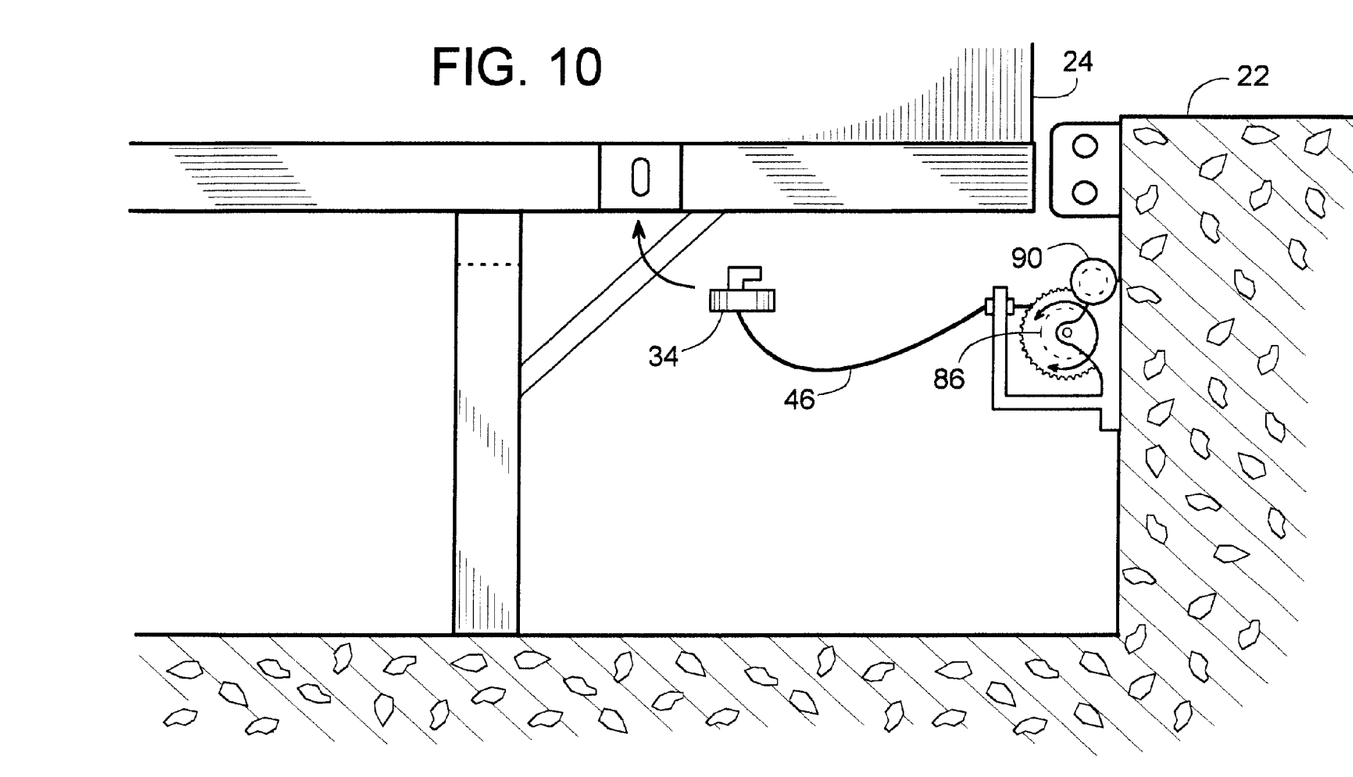
FIG. 10 is a side view of yet another alternate embodiment.

To take up the slack in an elongated member 46 or tighten it sufficiently to draw the back face of container 24 tightly up against dock 22 or bumper 58, various take-up members 52 can be used, as shown in FIGS. 8–10. For example, winch 52a of FIG. 8 (also used in the embodiment of FIG. 2) includes a manually operated lever, e.g., a crank 80, that rotatably drives a ratchet wheel 82 fixed to a rotating member, e.g., a drum 86, about which elongated member 46 wraps. Ratchet 82 in conjunction with a repositionable pawl 84 selectively provides bidirectional or unidirectional rotation of drum 86. With pawl 84 in a release position (as shown in phantom in FIG. 8), drum 86 freely pays out or draws in elongated member 46. When pawl 84 engages ratchet 82, the rotation of ratchet drum 86 is generally unidirectional with multiple stop positions for drum 86 at each tooth of ratchet 82. Pawl 84 engaging ratchet 82 allows drum 86 to take up elongated member 46 and then hold its position even after releasing crank 80.

In operating the restraint of FIG. 8, pawl 84 is released to unwind elongated member 46 so restraining member 34 can reach out to engage fitting 40. Once member 34 is engaged, pawl 84 is moved to engage ratchet 82, and crank 80 is turned (manually in this example) to rewind elongated member 46 about drum 86 and draw the back face of container 24 tightly up against dock 22 or bumper 58.

In an alternate embodiment, manually operated crank 80 is replaced by a torsional recoil spring (schematically represented by arrow 88), as shown in FIG. 9. Spring 88 urges drum 86 to take up and maintain elongated member 46 taut. To operate, pawl 84 is disengaged from ratchet 82 to unwind elongated member 46, so restraining member 34 can reach out to engage fitting 40. Once member 34 is engaged, pawl 84 is moved to engage ratchet 82. Spring 88 keeps elongated member taut while pawl 84 engaging ratchet 82 prevents elongated member 46 from unwinding, which in turn prevents container 24 from pulling away from the platform of dock 22. As container 24 is loaded or unloaded, some initial shaking of the container may occur. The pawl and ratchet allow the container to shift toward the dock's bumper 58 but limits the container from shifting away. Such an arrangement provides a self-tightening effect in that as container 24 shifts back toward the bumper, the ratchet may index (depending on the extent of the shift and the resolution of the ratchet) to hold the container at its new position closer to bumper 58.

For the take-up member of FIG. 10, a reversible motor 90 (e.g., electric, hydraulic or pneumatic) drives the rotation of drum 86 to selectively take up or pay out elongated member 46. Motor 90 in conjunction with a brake (if deemed necessary) can also serve to lock the drum in position, rather than using a pawl and ratchet arrangement. With this restraint, motor 90 drives drum 86 to unwind elongated member 46 so restraining member 34 can reach out to engage fitting 40. Once member 34 is engaged, the rotational direction of motor 90 is reversed to tighten elongated member 46 and restrain the container.

Figure 11:
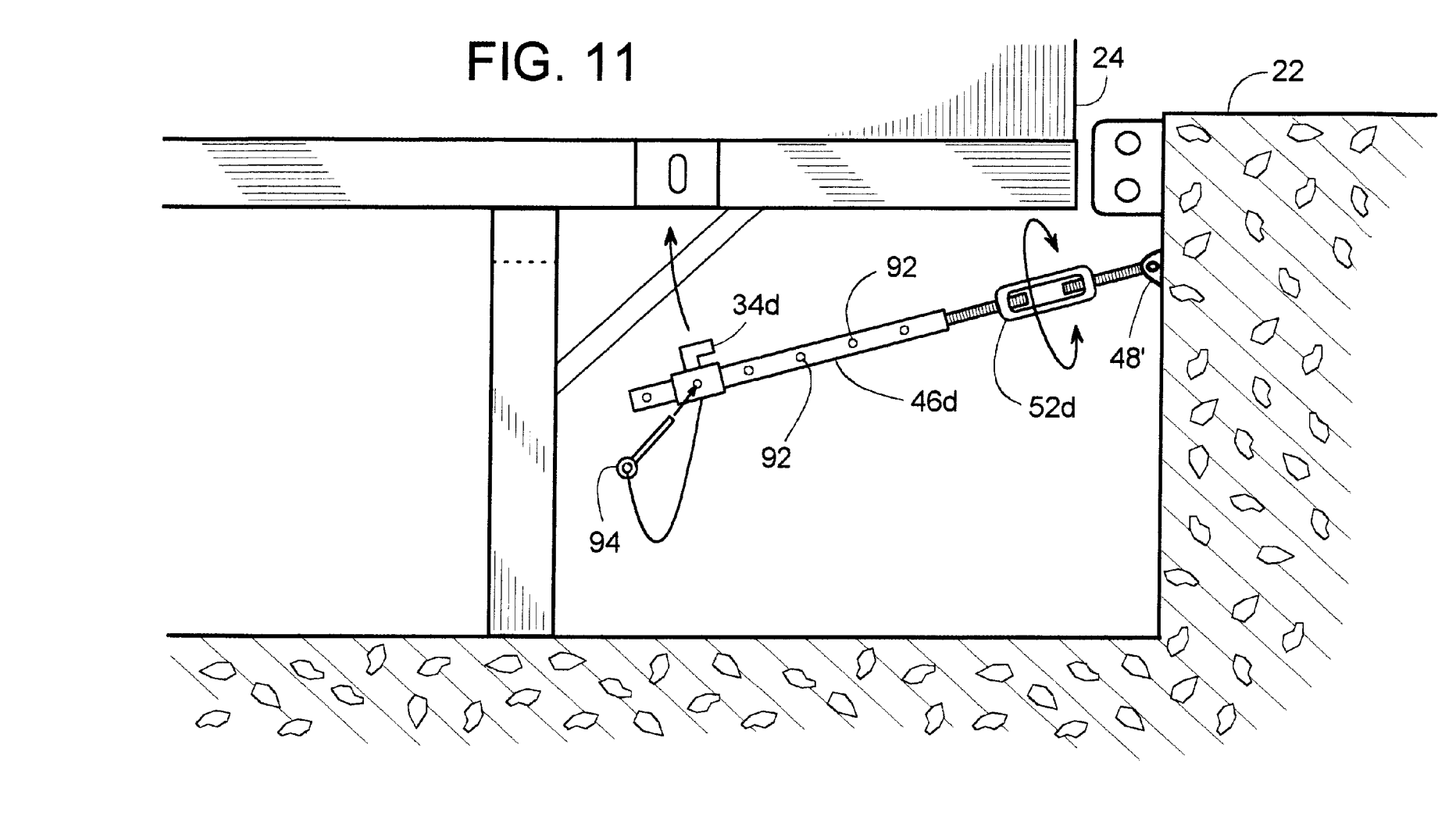
FIG. 11 is a side view of a restraint where the elongated member is a bar.

FIG. 11 illustrates a container restraint, wherein the elongated member is a rigid bar 46d. In this embodiment, bar 46d pivots at one end about a base 48' that is anchored to dock 22. At a generally opposite end, a restraining member 34d is selectively pinned to various discrete stops 92 (e.g., holes) by way of a pin 94. This allows the restraining member 34d to be slidingly positioned along the length of bar 46d for rough alignment with a hole 36 or 38 in fitting 40. A take-up member, e.g., a conventional turnbuckle 52d, can provide additional adjustment of the bar's effective length and can also serve to tighten the restraint, i.e., draw container 24 toward bumper 58.

Figure 12:
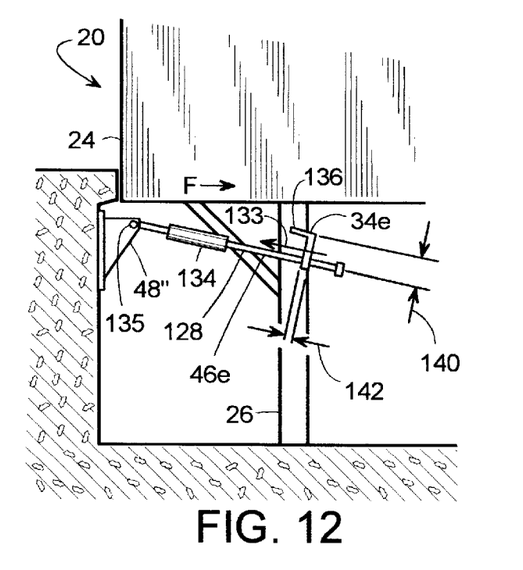
FIG. 12 is a side view of another embodiment of the invention.
Figure 13:
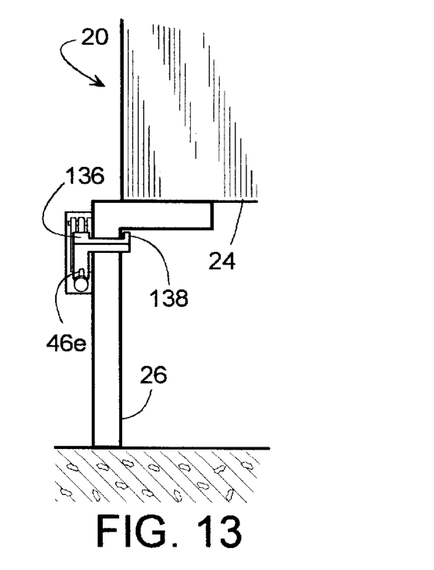
FIG. 13 is an end view of FIG. 12.
Figure 14:
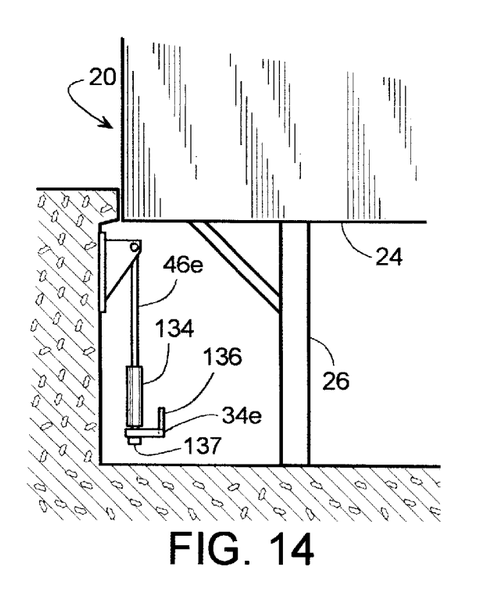
FIG. 14 is a side view of the embodiment of FIG. 12, but in a retracted position.
Figure 15:
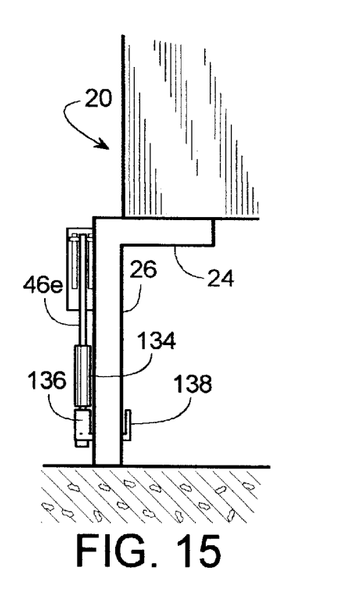
FIG. 15 is an end view of view FIG. 14.

FIGS. 12–15 illustrate yet another exemplary embodiment of a pivoting brace 128 adapted to engage and restrain at least one leg, e.g., leg 26, of swap body 20. In this example, the restraining member is a two-prong clamp 34e that slides along a elongated member 46e (e.g., a cylindrical rod) that pivots at an anchor point 135 of a base 48" attached to the dock wall or in some other way fixed in relation to the driveway. Once member 46e is pivoted to the position shown in FIG. 12, the effective length of member 46e can be changed. That is, restraining member 34e can be moved toward base 48" until member 34e engages the leg 26. In a locked position, as shown in FIGS. 12 and 13, prongs 136 and 138 straddle leg 26 to prevent restraining member 34e from slipping off of leg 26. With dimension 140 of restraining member 34e being significantly longer than a width 142, restraining member 34e tends to clamp onto elongated member 46e with a frictional binding force 133 that proportionally opposes force F in an action comparable to that of a conventional pipe clamp or adjustable tent pole. A sliding ram 134 can be added to help release clamp 130. For example, to release the clamp, ram 134 can be rapidly slid along elongated member 46e in a direction away from base 48" and rammed against restraining member 34e. It should be noted that this embodiment is schematically illustrated to encompass the countless variety of other well-known clamping strategies that could be used to hold restraining member 34e to elongated member 46e (e.g., the pin and hole design of FIG. 11). Regardless of which clamping design is used, once released and in the retracted position, as shown in FIGS. 14 and 15, brace 128 can be left hanging downward with restraining member 34e and ram 134 resting at the end 137 of rod 46e when brace 128 is not in use.

Although the embodiments just described have some structural variation, they share a common operational sequence that includes anchoring a base in a fixed relationship to the driveway, connecting a restraining member to the base by way of an elongated member, attaching the restraining member to a container's bottom fitting or a laterally extending section of the container's leg, and adjusting the elongated member's effective length (i.e., the length of the portion of the restraining member that extends between the base and the restraining member).

Although the invention is described with respect to a preferred embodiment, modifications thereto will be apparent to those skilled in the art. Therefore, the scope of the invention is to be determined by reference to the claims that follow:

We claim:

1. A restraint for limiting the movement of a swap body parked on a driveway at a loading area, the swap body having a leg that includes a laterally extending section coupled to a bottom portion of the swap body and a downward extending section adapted to support the swap body upon the driveway, also coupled to the bottom portion is a fitting having at least one oblong aperture, the restraint comprising:
   a base adapted to be coupled to stationary structure adjacent the loading area;
   a restraining member adapted to selectively engage at least one of the laterally extending section and the fitting; and
   an elongated member that couples the restraining member to the base and that is adapted to be variable in length once the restraining member is engaged to impart a restraining force on the swap body directed along the elongated member and toward the base.

2. The restraint as recited in claim 1, wherein the stationary structure is a loading dock wall.

3. The restraint as recited in claim 1, wherein the elongated member is an elongated pliable member.

4. The restraint as recited in claim 3, wherein the elongated pliable member is a strap.

5. The restraint as recited in claim 3, wherein the elongated pliable member is a cable.

6. The restraint as recited in claim 3, wherein the elongated pliable member is a chain having one end connected to the restraining member and an opposite end connected to the base.

7. The restraint as recited in claim 6, further comprising a hook having a first end coupled to one of the restraining member, the chain, and the base, the hook having a second end adapted to removably engage the chain at an intermediate point between the one end and the opposite end of the chain.

8. The restraint as recited in claim 3, further comprising a take-up member coupled to tighten the elongated pliable member.

9. The restraint as recited in claim 8, wherein the take-up member includes a toggle.

10. The restraint as recited in claim 8, further comprising an indicator light system that turns on to indicate that the restraining member may be engaging at least one of the laterally extending section and the fitting.

11. The restraint as recited in claim 3, further comprising a rotating member that selectively pays out and rewinds the elongated pliable member.

12. The restraint as recited in claim 11, wherein the rotating member includes a plurality of intermediate stop positions at which the rotating member can selectively resist paying out the elongated pliable member.

13. The restraint as recited in claim 12, further comprising a lever coupled to manually rotate the rotating member, and a ratchet coupled to the rotating member to provide the plurality of intermediate stop positions.

14. The restraint as recited in claim 12, further comprising a motor coupled to rotate the rotating member.

15. The restraint as recited in claim 11, further comprising a spring coupled to urge the rotating member to rewind the elongated pliable member.

16. The restraint as recited in claim 15, wherein the restraining member engaging at least one of the laterally extending section and the fitting serves as an electrical switch that turns on the indicator light.

17. The restraint as recited in claim 1, wherein the elongated member is an elongated bar pivotally connected to the base.

18. The restraint as recited in claim 17, wherein the elongated bar includes a plurality of discrete stops at which the restraining member is selectively repositioned along the elongated bar.

19. The restraint as recited in claim 17, wherein the restraining member clamps onto to the elongated bar by exerting a frictional binding force in reaction to the leg pushing against the restraining member.

20. The restraint as recited in claim 1, wherein the restraining member is adapted to releasably lock to the fitting upon rotating the restraining member after the restraining member is protruding through the aperture.

21. The restraint as recited in claim 20, wherein the restraining member includes an oblong plug that is adapted to fit through the oblong aperture and subsequently engage an interior surface of the fitting upon rotating the oblong plug.

22. A restraint for limiting the movement of a swap body parked at a driveway, the swap body having a leg that includes a laterally extending section coupled to a bottom portion of the swap body and a downward extending section adapted to support the swap body upon the driveway, also coupled to the bottom portion is a fitting having at least one oblong aperture, the restraint comprising:

a base adapted to be fixed in relation to the driveway;

a restraining member adapted to selectively engage at least one of the laterally extending section and the fitting; and an elongated pliable member coupling the restraining member to the base, a rotating member coupled to the base, the rotating member selectively paying out and rewinding the elongated pliable member to provide a variable length between the restraining member and the base; and a plurality of intermediate stop positions at which the rotating member can selectively resist paying out the elongated pliable member.

23. A method of limiting the movement of a swap body parked on a driveway, the swap body having a plurality of legs each with a laterally extending section coupled to a bottom portion of the swap body and a downward extending section adapted to support the swap body at the truck loading dock, also coupled to the bottom portion is a fitting having at least one oblong aperture extending to an interior surface of the fitting, the method comprising:

anchoring a base in a fixed orientation relative to the driveway;

connecting a restraining member to the base by way of an elongated member;

attaching the restraining member to at least one of the laterally extending section and the fitting; and reducing the effective length of the elongated member to impart a restraining force on the swap body directed along the elongated member and toward the base.

24. The method of claim 23, wherein the swap body is parked adjacent a receiving edge of a truck loading dock and further comprising the step of pulling the swap body substantially horizontally against the receiving edge of the truck loading dock.

25. The method of claim 23, further comprising turning an indicator light system on upon completing all of the anchoring, the connecting, the attaching, and the adjusting.

* * * * *